(12) United States Patent
Yamahata et al.

(10) Patent No.: US 11,104,198 B2
(45) Date of Patent: Aug. 31, 2021

(54) SUSPENSION CONTROL APPARATUS

(71) Applicant: HITACHI AUTOMOTIVE SYSTEMS, LTD., Hitachinaka (JP)

(72) Inventors: Masatoshi Yamahata, Chigasaki (JP); Nobuyuki Ichimaru, Yokohama (JP); Ryusuke Hirao, Kamagaya (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 16/975,914

(22) PCT Filed: Sep. 21, 2018

(86) PCT No.: PCT/JP2018/034984
§ 371 (c)(1),
(2) Date: Aug. 26, 2020

(87) PCT Pub. No.: WO2019/187224
PCT Pub. Date: Oct. 3, 2019

(65) Prior Publication Data
US 2020/0406699 A1  Dec. 31, 2020

(30) Foreign Application Priority Data

Mar. 29, 2018 (JP) .............................. JP2018-064536

(51) Int. Cl.
*B60G 17/016* (2006.01)
*B60G 17/019* (2006.01)
*B60G 17/08* (2006.01)

(52) U.S. Cl.
CPC ..... *B60G 17/016* (2013.01); *B60G 17/01908* (2013.01); *B60G 17/08* (2013.01); *B60G 2202/24* (2013.01); *B60G 2400/10* (2013.01)

(58) Field of Classification Search
CPC ........... B60G 17/016; B60G 17/01908; B60G 17/08; B60G 2202/24; B60G 2400/10
(Continued)

(56) References Cited

U.S. PATENT DOCUMENTS 5,996,748 A * 12/1999 Nezu .................. F16F 9/46
188/313
2006/0142916 A1* 6/2006 Onuma ............... B60G 17/015
701/38
(Continued)

FOREIGN PATENT DOCUMENTS

JP          10-2368        1/1998
JP          10-119529      5/1998

OTHER PUBLICATIONS

International Search Report dated Nov. 20, 2018 in International (PCT) Application No. PCT/JP2018/034984 with English translation.
(Continued)

*Primary Examiner* — Toan C To
(74) *Attorney, Agent, or Firm* — Wenderoth, Lind & Ponack, L.L.P.

(57) ABSTRACT

A shock absorber includes an inner cylinder electrode sealingly containing electrorheological fluid therein, a piston slidably inserted in the inner cylinder electrode, and a relief valve provided on the piston and configured to relieve an actual damping force according to a desired value. The controller includes an instruction value calculation portion configured to determine a high-voltage instruction value to output to the shock absorber based on a detection value output from a sprung acceleration sensor and an unsprung acceleration sensor. The electrorheological fluid has such a characteristic that an actual damping force value output according to the instruction value output from the instruction value calculation portion increases when a temperature is low compared to when the temperature is high. The relief valve and the high-voltage instruction value are set based on the actual damping force value that output when the temperature is high.

10 Claims, 13 Drawing Sheets

(58) Field of Classification Search
USPC ..... 280/5.5, 5.512, 5.515, 124.157, 124.159, 280/124.16
See application file for complete search history.

(56) References Cited

U.S. PATENT DOCUMENTS

| | | | |
|---|---|---|---|
| 2014/0217692 A1* | 8/2014 | Kato | B60G 17/08 |
| | | | 280/124.16 |
| 2015/0081171 A1* | 3/2015 | Ericksen | F16F 9/512 |
| | | | 701/37 |
| 2018/0339566 A1* | 11/2018 | Ericksen | B60G 17/015 |

OTHER PUBLICATIONS

Written Opinion of the International Searching Authority dated Nov. 20, 2018 in International (PCT) Application No. PCT/JP2018/034984 with English translation.

* cited by examiner

SUSPENSION CONTROL APPARATUS

TECHNICAL FIELD

The present invention relates to a suspension control apparatus mounted on a vehicle, such as an automobile.

BACKGROUND ART

Generally, a vehicle such as an automobile is equipped with a shock absorber (a damper) disposed between a vehicle body (sprung) side and each wheel (unsprung) side. Then, PTL 1 discusses a technique relating to a damping force-adjustable shock absorber, which estimates the temperature of a solenoid based on an electric current flowing in the solenoid of a proportional solenoid valve and corrects an electric current to supply to the solenoid according to this estimated temperature. PTL 2 discusses a technique relating to a shock absorber using electrorheological fluid, which estimates the temperature of the electrorheological fluid based on the electrostatic capacitance of the electrorheological fluid serving as hydraulic oil.

CITATION LIST

Patent Literature

[PTL 1] Japanese Patent Application Public Disclosure No. 10-119529
[PTL 2] Japanese Patent Application Public Disclosure No. 10-2368

SUMMARY OF INVENTION

Technical Problem

The configuration discussed in PTL 1 estimates the temperature of the solenoid of the damping force-adjustable shock absorber, thereby raising a possibility of causing a difference between this estimated temperature and the temperature of the hydraulic oil in the shock absorber. Therefore, when the technique discussed in PTL 1 is employed for, for example, a shock absorber using electrorheological fluid having a characteristic significantly changeable (a viscosity change) according to a change in the temperature as the hydraulic oil, this shock absorber may be unable to sufficiently deal with a change in the damping force characteristic according to the change in the temperature. On the other hand, the configuration discussed in PTL 2 can estimate the temperature of the electrorheological fluid in the shock absorber, but necessitates a circuit for measuring the electrostatic capacitance of the electrorheological fluid, thereby raising a possibility of making the apparatus complicated.

Solution to Problem

The present invention has been made in consideration of the above-described problems with the conventional techniques, and an object thereof is to provide a suspension control apparatus capable of preventing or reducing the change in the damping force according to the temperature.

According to one aspect of the present invention, a suspension control apparatus includes a vehicle behavior calculation portion (a vehicle movement calculation portion) configured to detect a behavior (movement) of a vehicle, a damping force-adjustable shock absorber provided between relatively movable two members of the vehicle, and a controller configured to adjust a damping force of the damping force-adjustable shock absorber based on a result of the detection by the vehicle behavior detection portion. The damping force-adjustable shock absorber includes a cylinder sealingly containing hydraulic fluid therein, a piston slidably inserted in this cylinder, a piston rod coupled with this piston and extending to outside the cylinder, an outer cylinder provided on an outer peripheral side of the cylinder, a reservoir provided between the cylinder and the outer cylinder, a body valve provided between the cylinder and the reservoir, and a relief valve provided on the piston or the body valve and configured to relieve an actual damping force according to a desired value. The controller includes an instruction value calculation portion configured to determine an instruction value (a voltage value or an electric current value) to output to the damping force-adjustable shock absorber based on a detection value output from the vehicle behavior detection portion. The hydraulic fluid has such a characteristic that an actual damping force value output according to the instruction value output from the instruction value calculation portion increases when a temperature is low compared to when the temperature is high. The relief valve and the instruction value are set based on the actual damping force value that output when the temperature is high.

The suspension control apparatus according to the one aspect of the present invention can prevent or reduce the change in the damping force according to the temperature.

DESCRIPTION OF EMBODIMENTS

In the following description, a suspension control apparatus according to embodiments will be described based on an example in which this suspension control apparatus is mounted on a four-wheeled automobile with reference to the accompanying drawings.

Figure 1:
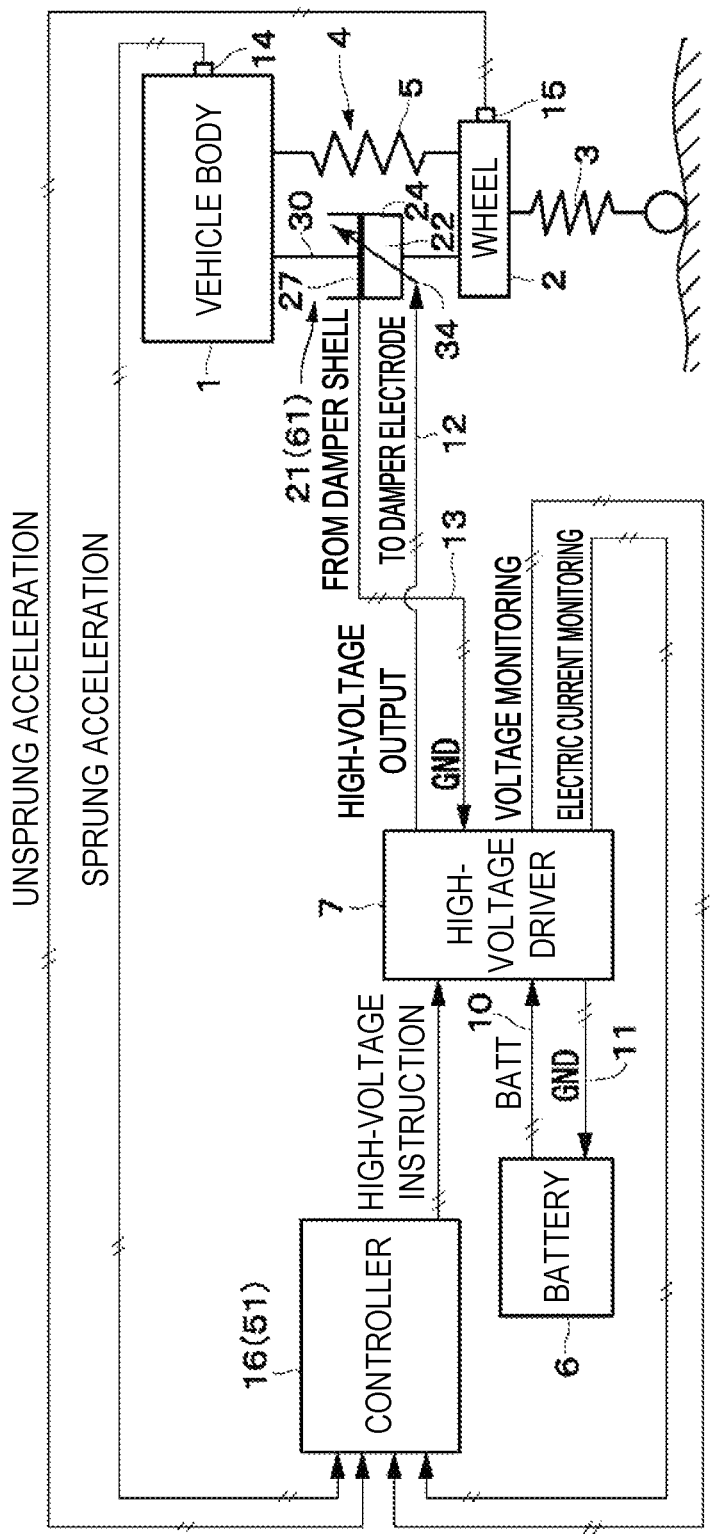
FIG. 1 is a schematic view illustrating a suspension control apparatus according to each of first to third embodiments.

FIGS. 1 to 4 illustrate a first embodiment. In FIG. 1, a vehicle body 1 forms a main structure of the vehicle. Wheels forming the vehicle together with the vehicle body 1, such as front left and right wheels and rear left and right wheels (hereinafter collectively referred to as the wheel 2) are provided under the vehicle body 1. The wheel 2 includes a tire 3, and the tire 3 functions as a spring that absorbs the minute roughness of a road surface.

A suspension apparatus 4 is provided so as to be interposed at a position between the vehicle body 1 and the wheel 2, which corresponds to a position between relatively movable two members of the vehicle. The suspension apparatus 4 includes a suspension spring 5 (hereinafter referred to as the spring 5), and a damping force-adjustable shock absorber (hereinafter referred to as the shock absorber 21) provided at the position between the vehicle body 1 and the wheel 2, which corresponds to the position between the two members, while being arranged in parallel with this spring 5. FIG. 1 illustrates the suspension apparatus 4 in a case where one set of suspension apparatus 4 is provided between the vehicle body 1 and the wheel 2 by way of example. However, the suspension apparatus 4 is supposed to be mounted in such a manner that, for example, four sets in total are provided individually independently between the four wheels 2 and the vehicle body 1, respectively. FIG. 1 schematically illustrates only one set of them.

The shock absorber 21 of the suspension apparatus 4 is provided between the relatively movable two members of the vehicle (between the vehicle body 1 and the wheel 2). The shock absorber 21 functions to damp a vertical movement of the wheel 2. The shock absorber 21 is configured as a damping force-adjustable shock absorber using electrorheological fluid 22 as hydraulic oil (hydraulic fluid). As will be described below, the shock absorber 21 includes an inner cylinder electrode 23, a piston 27, a piston rod 30, and an intermediate electrode cylinder 34. The electrorheological fluid 22 is sealingly contained in the inner cylinder electrode 23. The piston 27 is slidably inserted in this inner cylinder electrode 23. The piston rod 30 is coupled with this piston 27 and extends to outside the inner cylinder electrode 23. The intermediate electrode cylinder 34 is provided at a portion where a flow of the electrorheological fluid 22 is generated due to a sliding motion of the piston 27 in the inner cylinder electrode 23, and serves as an electrode that applies an electric field to this electrorheological fluid 22.

Then, the electrorheological fluid (ERF: Electric Rheological Fluid) 22 includes, for example, base oil (base fluid) embodied by, for example, silicon oil, and particles (fine particles) mixed (distributed) in this base oil and making the viscosity (the consistency) changeable according to a change in the electric field. By this composition, the electrorheological fluid 22 exhibits flow resistance (a damping force) changeable according to a voltage applied thereto. That is, the shock absorber 21 can continuously adjust the characteristic of the generated damping force (a damping force characteristic) from a strong (hard) characteristic (a high characteristic) to a weak (soft) characteristic (a low characteristic) according to a voltage applied to the intermediate electrode cylinder 34 provided at the portion where a flow of the electrorheological fluid 22 is generated. The shock absorber 21 may be configured to be able to adjust the damping force characteristic in two steps or a plurality of steps without being limited to continuously adjusting the damping force characteristic.

A battery 6 serves as an electric power source for applying electric power to the intermediate electrode cylinder 34 of the shock absorber 21, and includes, for example, a 12V in-vehicle battery serving as an auxiliary battery of the vehicle (and an alternator that charges the in-vehicle battery as necessary). The battery 6 is connected to the shock absorber 21 (the intermediate electrode cylinder 34 and the inner cylinder electrode 23) via a high-voltage driver 7 including a booster circuit 8. For example, in a case of a hybrid automobile or an electric automobile including an electric motor for driving (a driving motor), a high-capacity battery for driving the vehicle (not illustrated) can also be used as the electric power source of the shock absorber 21.

The high-voltage driver 7 generates a high voltage to apply to the electrorheological fluid 22 in the shock absorber 21. To exert this function, the high-voltage driver 7 is connected to the battery 6 serving as the electric power source via a battery line (a batt line) 10 forming a (low-voltage) direct-current electric power line, and a ground line (a GND line) 11. In addition thereto, the high-voltage driver 7 is connected to the shock absorber 21 (the intermediate electrode cylinder 34 and the inner cylinder electrode 23) via a high-voltage output line 12 forming a (high-voltage) direct-current electric power line, and a ground line (a GND line) 13.

Figure 2:
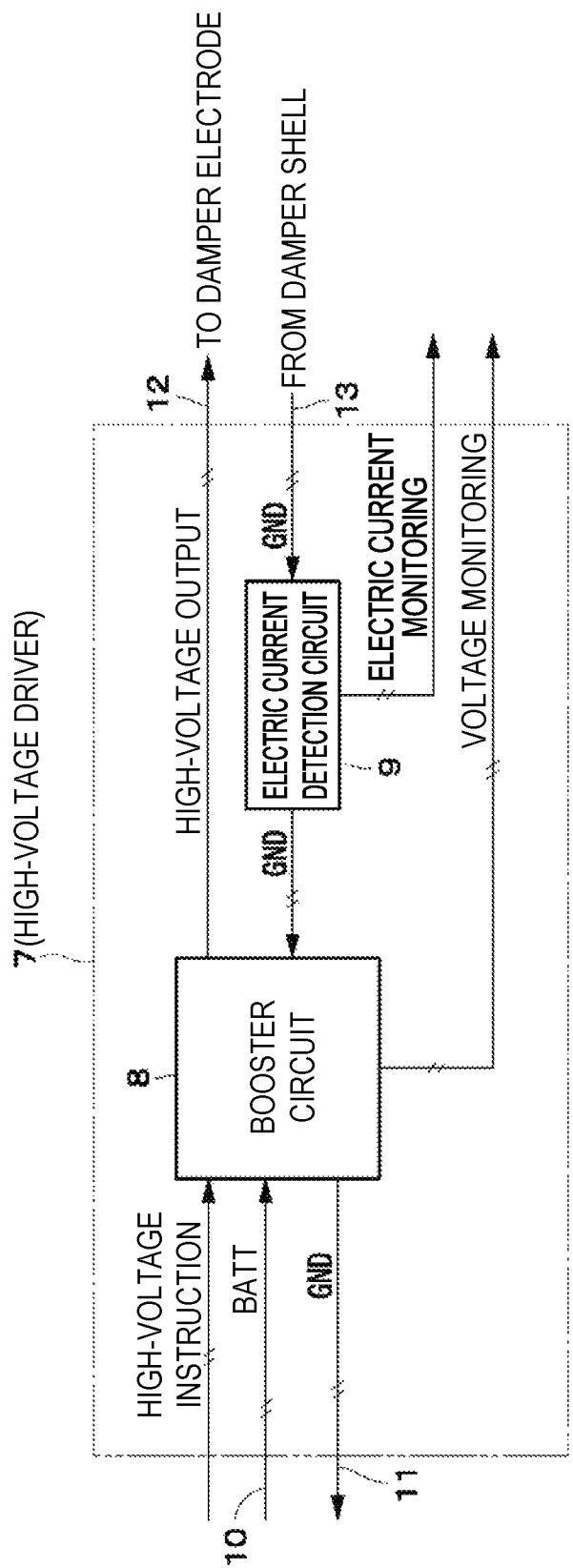
FIG. 2 is a block diagram illustrating a high-voltage driver in FIG. 1.

The high-voltage driver 7 increases a direct-current voltage output from the battery 6 to supply (output) it to the shock absorber 21 based on an instruction (a high-voltage instruction) output from a controller 16. As illustrated in FIG. 2, the high-voltage driver 7 includes the booster circuit 8, which boosts the direct-current voltage of the battery 6, and an electric current detection circuit 9, which detects a battery electric current. The high-voltage driver 7 controls a voltage to be output from the booster circuit 8 to the shock absorber 21 according to the instruction input from the controller 16.

The electric current detection circuit 9 is provided between the booster circuit 8 and the shock absorber 21 (the ground line 13 side). The electric current detection circuit 9 detects an electric current value flowing in the electrorheological fluid 22, and outputs an electric current monitoring signal indicating this electric current value to the controller 16. Further, the high-voltage driver 7 monitors (observes) the voltage supplied to the electrorheological fluid 22, and outputs a monitoring signal of this voltage to the controller 16.

A sprung acceleration sensor 14 is provided on the vehicle body 1 side. More specifically, the sprung acceleration sensor 14 is mounted on the vehicle body 1 at, for example, a position near the shock absorber 21. Then, the sprung acceleration sensor 14 detects the acceleration of a vertical vibration on the vehicle body 1 side corresponding to a so-called sprung side, and outputs a detection signal thereof to the controller 16.

An unsprung acceleration sensor 15 is provided on the wheel 2 side of the vehicle. The unsprung acceleration sensor 15 detects the acceleration of a vertical vibration on the wheel 2 side corresponding to a so-called unsprung side, and outputs a detection signal thereof to the controller 16. In this case, the sprung acceleration sensor 14 and the unsprung acceleration sensor 15 form a vehicle behavior detection portion (more specifically, a vertical movement detection portion), which detects the behavior of the vehicle (more specifically, the state regarding the vertical movement of the vehicle).

The vehicle behavior detection portion is not limited to the sprung acceleration sensor 14 provided near the shock absorber 21 and the unsprung acceleration sensor 15, and, for example, may be only the sprung acceleration sensor 14 or may be a vehicle height sensor (not illustrated). Further alternatively, the vehicle behavior detection portion may be a vehicle behavior detection sensor that detects the behavior of the vehicle (the state amount) other than the acceleration sensors 14 and 15 and the vehicle height sensor, such as a wheel speed sensor (not illustrated) that detects the rotational speed of the wheel 2. In this case, the vehicle behavior detection portion may be configured to detect the vertical movement of the vehicle by, for example, estimating the vertical movement for each wheel 2 based on information from one sprung acceleration sensor 14 (an acceleration) and information from the wheel speed sensor (a wheel speed).

The controller 16 adjusts the damping force of the shock absorber 21 based on the result of the detection by the vehicle behavior detection portion (the sprung acceleration sensor 14 and the unsprung acceleration sensor 15). The controller 16 includes, for example, a microcomputer. The controller 16 includes an instruction value calculation portion 17, which calculates the instruction value to output to the high-voltage driver 7 (the booster circuit 8 thereof), i.e., a high-voltage instruction value based on the information acquired from the sprung acceleration sensor 14 and the unsprung acceleration sensor 15. The controller 16 outputs the high-voltage instruction value to the high-voltage driver 7 of the shock absorber 21, which is the damping force-variable damper. The high-voltage driver 7 outputs a high voltage according to this instruction value to the intermediate electrode cylinder 34 of the shock absorber 21 based on the high-voltage instruction value from the controller 16. When the high voltage is input to the shock absorber 21, the viscosity of the electrorheological fluid 22 changes according to a change in the voltage value thereof (an electric potential difference between the intermediate electrode cylinder 34 and the inner cylinder electrode 23), whereby the damping force characteristic of the shock absorber 21 can be switched (adjusted).

Figure 3:
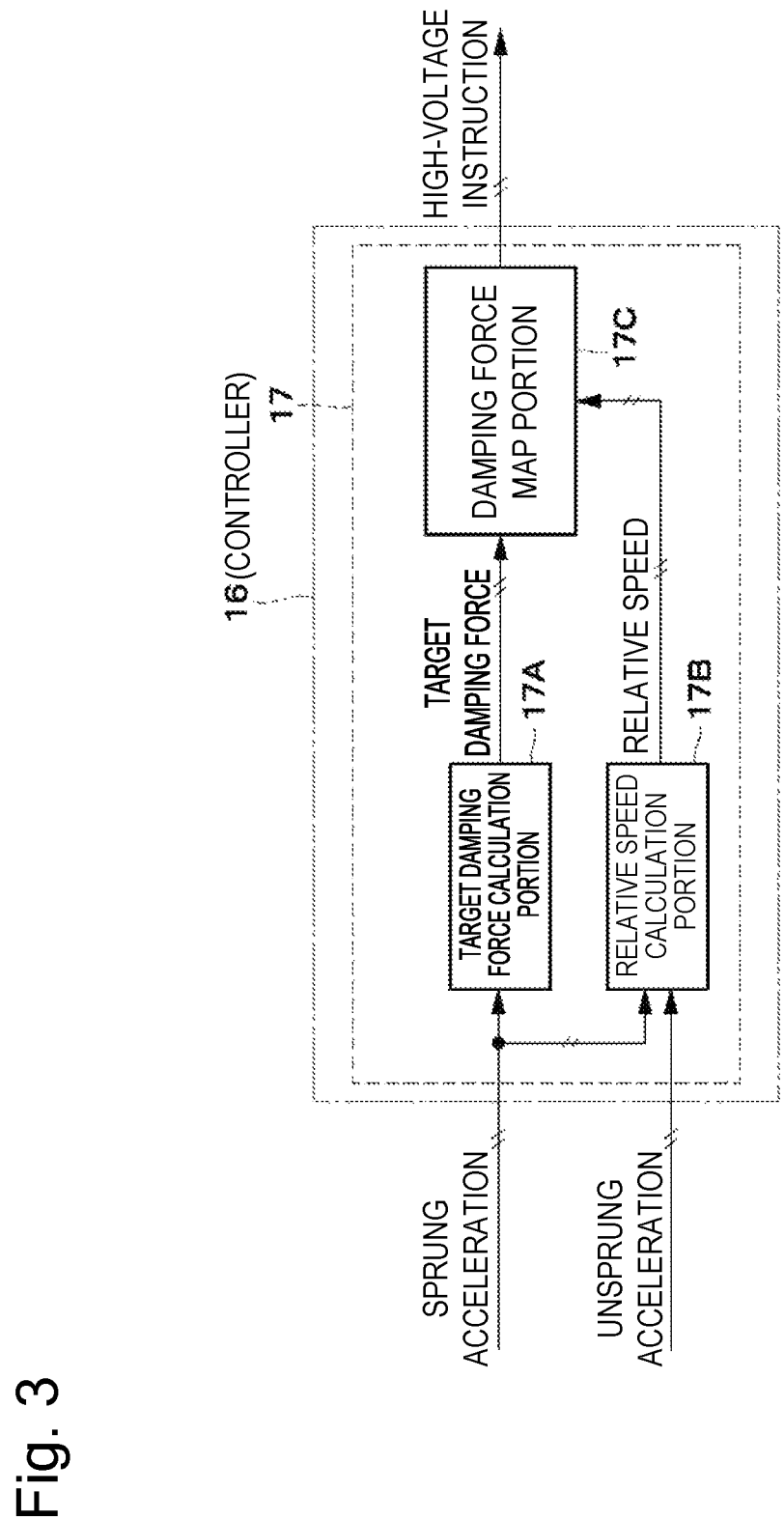
FIG. 3 is a block diagram illustrating a controller in FIG. 1.

As illustrated in FIG. 3, the instruction value calculation portion 17 of the controller 16 includes a target damping force calculation portion 17A, a relative speed calculation portion 17B, and a damping force map portion 17C.

The target damping force calculation portion 17A estimates and calculates the speed of a vertical displacement of the vehicle body 1 by integrating the detection signal from the sprung acceleration sensor 14 (i.e., the sprung acceleration). The target damping force calculation portion 17A calculates a target damping force to be generated by the shock absorber 21 by multiplying this sprung speed by, for example, a skyhook damping coefficient determined from the skyhook control theory. The control law for determining the target damping force is not limited to the skyhook control, and, for example, feedback control such as the optimization control and the H∞control can be used as it. The target damping force calculated by the target damping force calculation portion 17A is output to the damping force map portion 17C.

The target damping force calculation portion 17A is not limited to the configuration that calculates the target damping force based on the sprung speed. For example, the target damping force calculation portion 17A may derive an optimum target damping force by calculating ride comfort control or steering stability control based on the signals acquired from the sprung acceleration sensor 14 and the unsprung acceleration sensor 15, and a steering angle, an accelerator position, and brake hydraulic pressure information acquired from another system (not illustrated).

The relative speed calculation portion 17B calculates a vertical relative speed between the vehicle body 1 and the wheel 2 by calculating a vertical relative acceleration between the vehicle body 1 and the wheel 2 based on a difference between the detection signal from the unsprung acceleration sensor 15 (i.e., the unsprung acceleration) and the detection signal from the sprung acceleration sensor 14 (i.e., the sprung acceleration), and integrating this relative acceleration. The relative speed calculated by the relative speed calculation portion 17B is output to the damping force map portion 17C.

The target damping force and the relative speed are input to the damping force map portion 17C. The damping force map portion 17C calculates the high-voltage instruction value, based on which the instruction voltage is generated, from the target damping force and the relative speed with use of a damping force map. Now, the damping force map portion 17C includes the damping force map corresponding to the characteristic (the relationship) among the relative speed, the target damping force, and the high-voltage instruction value that should be applied. The damping force map is acquired from an experiment, a simulation, or the like and is set (stored) in the damping force map portion 17C in advance as a map corresponding to the relationship (the characteristic) among the target damping force, the relative speed, and the instruction voltage that should be applied.

Then, the damping force map portion 17C calculates the high-voltage instruction value, according to which the instruction voltage is generated, based on the damping force characteristic that is established when the electrorheological fluid 22 has a high temperature (for example 100° C.). By this calculation, a value according to an actual damping force value that is be generated by the electrorheological fluid 22 when the electrorheological fluid 22 has a high temperature is acquired as the high-voltage instruction value calculated by the damping force map portion 17C. In this case, the electrorheological fluid 22 has such a characteristic that the actual damping force value output according to the high-voltage instruction value output from the instruction value calculation portion 17 increases when the electrorheological fluid 22 has a low temperature compared to when the electrorheological fluid 22 has a high temperature. Therefore, when the electrorheological fluid 22 has a low temperature compared to when the electrorheological fluid 22 has a high temperature, the damping force actually generated by the shock absorber 21 (the actual damping force) tends to increase compared to the target damping force.

The high-voltage instruction value is calculated with use of the map in the embodiment, but is not limited to being calculated with use of the map and may be calculated with use of, for example, a calculation equation (a function), an array, or the like corresponding to the relationship (the characteristic) among the target damping force, the relative speed, and the instruction voltage. Further, the target damping force is used as the control instruction in the embodiment, but the instruction value calculation portion 17 may be configured to use a target damping force coefficient.

Figure 4:
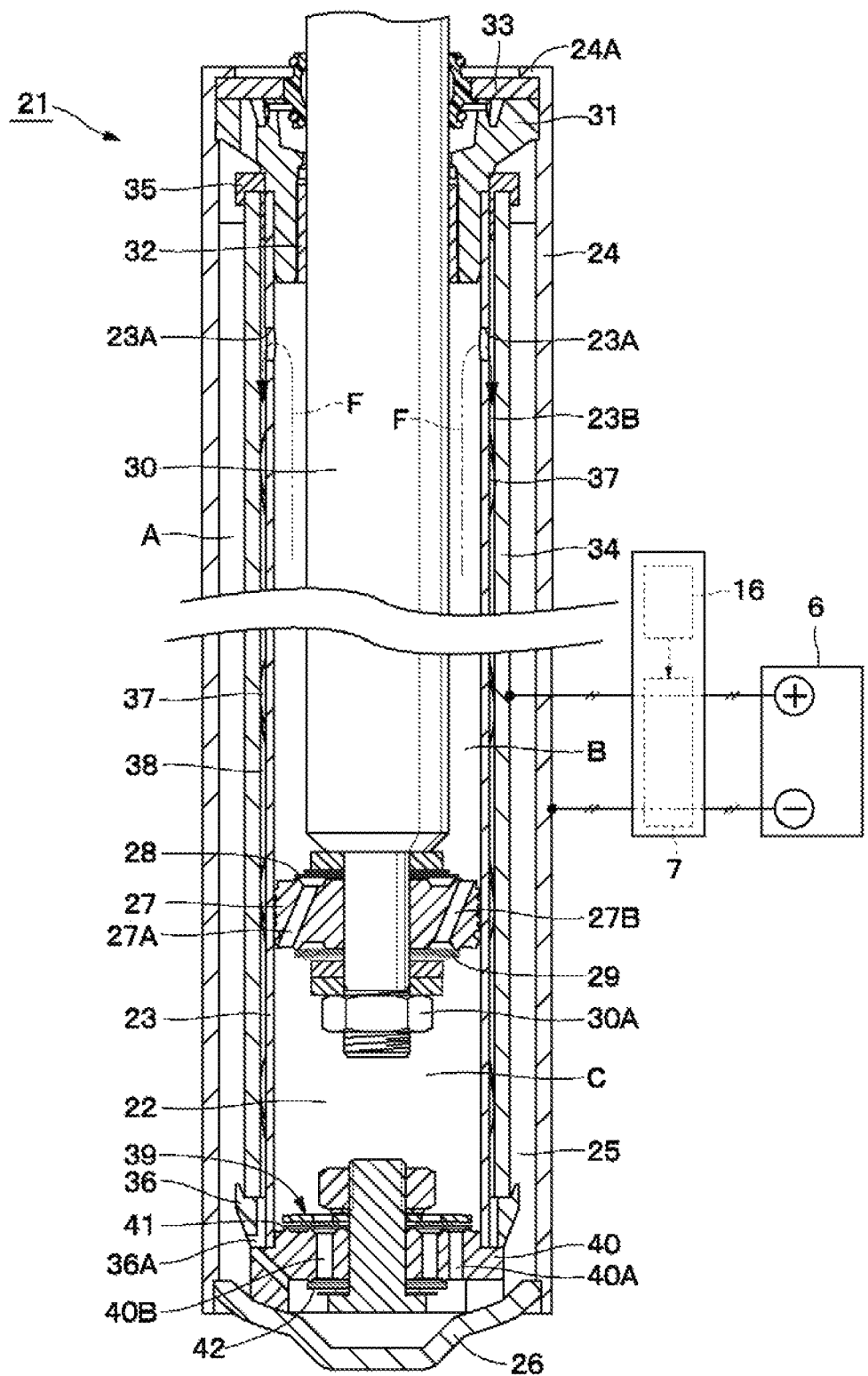
FIG. 4 is a vertical cross-sectional view illustrating a shock absorber in FIG. 1.

Next, the specific configuration of the shock absorber 21 will be described with reference to FIG. 4.

In FIG. 1, the shock absorber 21 is configured as the damping force-adjustable hydraulic shock absorber (a semi-active damper) using the electrorheological fluid 22 including the hydraulic oil or the like sealingly contained in the shock absorber 1. The shock absorber 21 forms the suspension apparatus for the vehicle together with, for example, the spring 5 embodied by a coil spring. In the following description, the shock absorber 21 will be described assuming that one axial end side and the other axial end side of the shock absorber 21 correspond to an "upper end" side and a "lower end" side, respectively, but the one axial end side and the other axial end side of the shock absorber 21 may be set so as to correspond to the "lower end" side and the "upper end" side, respectively.

The shock absorber 21 includes the inner cylinder electrode 23, an outer cylinder 24, a reservoir 25, a piston 27, a piston rod 30, the intermediate electrode cylinder 34, flow passages 38, and a body valve 39.

The inner cylinder electrode 23 forms a cylinder. The inner cylinder electrode 23 forms an innermost cylindrical member (an inner cylinder), and is shaped like an axially extending cylinder. The electrorheological fluid 22, which is functional fluid, is sealingly contained inside the inner cylinder electrode 23. Further, the piston rod 30 is inserted inside the inner cylinder electrode 23 from the one axial side. The outer cylinder 24 and the intermediate electrode cylinder 34 are coaxially provided outside the inner cylinder electrode 23. The piston rod 30 is axially inserted inside the inner cylinder electrode 23.

The lower end side of the inner cylinder electrode 23 is attached to a body member 40 of the body valve 39 by being fitted thereto. The upper end side of the inner cylinder electrode 23 is attached to the rod guide 31 by being fitted thereto. A plurality of oil holes 23A is provided on the upper side of the inner cylinder electrode 23 at circumferential intervals while extending radially through the inner cylinder electrode 23. Partition walls 37 are provided so as to be helically wounded on an outer peripheral surface 23B, which forms the outer peripheral side of the inner cylinder electrode 23.

Then, the inner cylinder electrode 23 is made from a material capable of becoming a conductor (an electric conductor), and is configured as a negative (minus) electrode. The inner cylinder electrode 23 is electrically connected to the negative electrode (the minus electrode) of the high-voltage driver 7 via the outer cylinder 24, the rod guide 31, the body valve 39, and the like.

The outer cylinder 24 forms an outer cylinder. The outer cylinder 24 forms an outer shell of the shock absorber 21, and is prepared as a cylindrical member with use of a material capable of becoming a conductor (an electric conductor). The outer cylinder 24 is provided outside the inner cylinder electrode 23 and the intermediate electrode cylinder 34. The outer cylinder 24 forms the reservoir 25 defined by a reservoir chamber A in communication with the flow passages 38 between the outer cylinder 24 and the intermediate electrode cylinder 34. Therefore, the reservoir 25 is provided between the inner cylinder electrode 23 serving as the cylinder and the outer cylinder 24 serving as the outer cylinder. In this case, the lower end side of the outer cylinder 24 is formed as a closed end due to the fixed attachment of a bottom cap 26 to the lower end of this outer cylinder 24 with use of a welding method or the like. The bottom cap 26 is formed so as to protrude downward toward the radially central portion.

The upper end side of the outer cylinder 24 is formed as an opening end. For example, a swaged portion 24A is formed on the opening end side of the outer cylinder 24 by bending the outer cylinder 24 radially inwardly. The swaged portion 24A fixes the inner cylinder electrode 23, the rod guide 31, and the intermediate electrode cylinder 34 in the outer cylinder 24 together with a seal member 33 by pressing the outer peripheral side of the seal member 33 from the upper side.

Then, the electrorheological fluid 22 serving as the hydraulic fluid is sealingly contained in the inner cylinder electrode 23 (the cylinder). FIG. 4 illustrates the sealingly contained electrorheological fluid 22 in a colorless and transparent manner.

The electrorheological fluid 22 is fluid having a property changeable according to an electric field (a voltage). More specifically, the electrorheological fluid 22 has viscosity changeable according to a voltage applied thereto, and thus exhibits flow resistance (a damping force) changeable according thereto. The electrorheological fluid 22 includes base oil (base fluid) embodied by, for example, silicon oil, and particles (fine particles) mixed (distributed) in this base oil and making the viscosity changeable according to the change in the electric field.

The shock absorber 21 is configured to control (adjust) the generated damping force by causing an electric potential difference to be generated in the electrode passages 38 between the inner cylinder electrode 23 and the intermediate electrode cylinder 34 to control the viscosity of the electrorheological fluid 22 passing through the electrode passages 38.

The annular reservoir chamber A is formed between the outer cylinder 24 and the intermediate electrode cylinder 34. Gas serving as working gas is sealingly contained in the reservoir chamber A together with the electrorheological fluid 22. This gas may be air in an atmospheric-pressure state, or gas such as compressed nitrogen gas may be used as it. At the time of a compression stroke of the piston rod 30, the gas in the reservoir chamber A is compressed so as to compensate for the volume of the entry of this piston rod 30.

The piston 27 is slidably provided in the inner cylinder electrode 23. This piston 27 divides the inside of the inner cylinder electrode 23 into a rod-side chamber B located on the upper side and a bottom-side chamber C located on the lower side. A plurality of oil passages 27A and a plurality of oil passages 27B are formed in the piston 27 at circumferential intervals (only one of them is illustrated for each of the pluralities of oil passages 27A and oil passages 27B). The oil passages 27A and 27B can establish the communication between the rod-side chamber B and the bottom-side chamber C.

Then, the shock absorber 21 according to the embodiment has a uniflow structure. Therefore, the electrorheological fluid 22 in the inner cylinder electrode 23 flows from the rod-side chamber B toward the flow passages 38 via each of the oil holes 23A of the inner cylinder electrode 23 constantly unidirectionally (the direction indicated by an arrow F in FIG. 4) during both the compression stroke and the extension stroke of the piston rod 30.

To realize such a uniflow structure, for example, a compression-side check valve 28 is provided on the upper end surface of the piston 27. The compression-side check valve 28 is opened when the piston 27 is slidably displaced downward in the inner cylinder electrode 23 during the compression stroke of the piston rod 30, and otherwise is closed. The compression-side check valve 28 permits the electrorheological fluid 22 in the bottom-side chamber C to flow through each of the oil passages 27A toward the rod-side chamber B, and prohibits the electrorheological fluid 22 from flowing in the opposite direction therefrom. In other words, the compression-side check valve 28 permits only the flow of the electrorheological fluid 22 directed from the bottom-side chamber C toward the rod-side chamber B.

An extension-side relief valve 29 is provided on the piston 27. The relief valve 29 relieves the actual damping force according to a desired value. The relief valve 29 is formed by, for example, a disk valve provided on the lower end surface of the piston 27. The extension-side relief valve 29 is opened upon exceedance of the pressure in the rod-side chamber B over a relief setting pressure (a valve-opening pressure) when the piston 27 is slidably displaced upward in the inner cylinder electrode 23 during the extension stroke of the piston rod 30, and relieves the pressure at this time by releasing it to the bottom-side chamber C side via each of the oil passages 27B.

The piston rod 30 is coupled with the piston 27, and extends to outside the inner cylinder electrode 23. The piston rod 30 extends axially (vertically in FIG. 4) in the inner cylinder electrode 23. The piston rod 30 is coupled (fixed) at the lower end side thereof with the piston 27 with use of a nut 30A or the like in the inner cylinder electrode 23. On the other hand, the upper end side of the piston rod 30 extends to outside the inner cylinder electrode 23 and the outer cylinder 24 in a state being guided by the rod guide 31 while extending through the rod-side chamber B.

The rod guide 31 is provided fittedly to the upper end sides of the inner cylinder electrode 23 and the outer cylinder 24. The rod guide 31 closes the upper end sides of the inner cylinder electrode 23 and the outer cylinder 24. The rod guide 31 functions to support the piston rod 30 via a guide bush 32, and is formed as a stepped cylindrical member made from a metallic material (a conductor). In this case, in a case where the body member 40 is made from a metallic material (a conductor), the rod guide 31 can also be formed with use of a material containing an insulator, a dielectric, a highly resistive element, or the like, such as a rigid resin material. Then, the rod guide 31 positions the upper portion of the inner cylinder electrode 23 and the upper portion of the intermediate electrode cylinder 34 coaxially with the outer cylinder 24. Along therewith, the rod guide 31 axially slidably leads (guides) the piston rod 30 via the guide bush 32 on the inner peripheral side thereof.

An annular seal member 33 is provided between the rod guide 31 and the swaged portion 24A of the outer cylinder 24. The seal member 33 liquid-tightly or air-tightly form a seal (seals) between the outer cylinder 24 and the piston rod 30 due to the sliding contact of a seal portion on the inner peripheral side thereof with the outer peripheral surface of the piston rod 30.

The intermediate electrode cylinder 34 is provided outside the inner cylinder electrode 23 so as to surround this inner cylinder electrode 23. The intermediate electrode cylinder 34 is formed so as to extend axially at an intermediate position between the inner cylinder electrode 23 and the outer cylinder 24. The intermediate electrode cylinder 34 is made from a material capable of becoming a conductor (for example, a metallic material), and forms a cylindrical positive electrode. The intermediate electrode cylinder 34 forms the flow passages 38 in communication with the rod-side chamber B and the reservoir chamber A between the intermediate electrode cylinder 34 and the inner cylinder electrode 23. The intermediate electrode cylinder 34 is electrically connected to the positive electrode (the plus electrode) of the high-voltage driver 7.

The upper end side of the intermediate electrode cylinder 34 is held in a state positioned vertically and radially relative to the rod guide 31 via an upper-side holding member 35. On the other hand, the lower end side of the intermediate electrode cylinder 34 is held in a state positioned vertically and radially relative to the body member 40 of the body valve 39 via a lower-side holding member 36 serving as a bottom valve-side holding member. A plurality of oil passages 36A is formed in this lower-side holding member 36 so as to correspond to the respective flow passages 38. These oil passages 36A function to allow the electrorheological fluid 22 transmitted through the flow passages 38 to flow out to the reservoir chamber A, and form a part of the flow passages 38.

The plurality of partition walls 37 is provided on the outer peripheral surface of the inner cylinder electrode 23 so as to extend vertically and helically. Each of the partition walls 37 is formed as an elongated protrusion protruding radially outward from the outer peripheral surface of the inner cylinder electrode 23, and the distal end portion of the elongated protrusion is in abutment with the inner peripheral surface of the intermediate electrode cylinder 34. Due to this configuration, the partition walls 37 form the plurality of flow passages 38 between the inner cylinder electrode 23 and the intermediate electrode cylinder 34, respectively. Each of the partition walls 37 is made from an elastic polymer material such as elastomer that is also electrically insulative. Examples of such a material include synthetic rubber. Each of the partition walls 37 is fixedly attached (adheres) to the inner cylinder electrode 23 with use of, for example, an adhesive.

Each of the flow passages 38 is helically divided by each of the partition walls 37, whereby a plurality of flow passages 38, such as four flow passages 38, is formed between the inner cylinder electrode 23 and the intermediate electrode cylinder 34. Each of the flow passages 38 is configured in such a manner that the electrorheological fluid 22 flows from the upper side corresponding to the one axially end side toward the lower side corresponding to the other axially end side due to the extension/compression movement of the piston rod 30. The upper side of each of the flow passages 38, which corresponds to the upstream side in the direction in which the electrorheological fluid 22 flows, is in constant communication with the rod-side chamber B via the oil hole 23A of the inner cylinder electrode 23. More specifically, the shock absorber 21 causes the electrorheological fluid 22 to flow from the rod-side chamber B into each of the flow passages 38 via the oil hole 23A during both the compression stroke and the extension stroke of the piston 27 as indicated by the direction in which the electrorheological fluid 22 flows, which is represented by the arrow F in FIG. 4. The electrorheological fluid 22 delivered into each of the flow passages 38 flows through each of the flow passages 38 from the upper end side toward the lower end side during both the extension operation and the compression operation of the piston rod 30.

At this time, flow resistance is applied to the flowing electrorheological fluid 22 in each of the flow passages 38. To realize this application, for example, the intermediate electrode cylinder 34 is connected to the battery 6 serving as the electric power source via the high-voltage driver 7, which generates the high voltage. The high-voltage driver 7 serves as a voltage supply portion (an electric field supply portion), and functions as an electrode (an electric pole) that applies the electric field (the voltage) to the electrorheological fluid 22 in the intermediate electrode cylinder 34 and each of the flow passages 38. In this case, both the end sides of the intermediate electrode cylinder 34 are electrically insulated by the electrically insulating holding members 35 and 36. On the other hand, the inner cylinder electrode 23 is connected to the negative electrode (ground) of the high-voltage driver 7 via the rod guide 31, the bottom valve 39, the bottom cap 26, the outer cylinder 24, and the like.

In each of the flow passages 38, the flow resistance is increased by applying the electric field (the voltage) to the electrorheological fluid 22 by the high-voltage driver 7 and thus increasing the viscosity of the electrorheological fluid 22. Then, after flowing through each of the flow passages 38, the electrorheological fluid 22 flows out from the oil passage 36A of the lower-side holding member 36 into the reservoir chamber A.

The body valve 39 is positioned between the inner cylinder electrode 23 and the bottom cap 26, and is provided on the lower end side of the inner cylinder electrode 23. The body valve 39 is provided between the inner cylinder electrode 23 and the reservoir 25. The bottom valve 39 functions to establish/block the communication between the bottom-side chamber C and the reservoir chamber A. To exert this function, the body valve 39 includes the body member 40, an extension-side check valve 41, and a relief valve 42.

The body member 40 is placed between the bottom cap 26 and the inner cylinder electrode 23, and defines the reservoir chamber A and the bottom-side chamber C. A plurality of oil passages 40A and a plurality of oil passages 40B are formed in the body member 40 at circumferential intervals (only one of them is illustrated for each of the pluralities of oil passages 40A and oil passages 40B). The oil passages 40A and 40B can establish the communication between the reservoir chamber A and the bottom-side chamber C.

The extension-side check valve 41 is provided on, for example, the upper surface side of the body member 40. The extension-side check valve 41 is opened when the piston 27 is slidably displaced upward during the extension stroke of the piston rod 30, and otherwise is closed. The extension-side check valve 41 permits the electrorheological fluid 22 (the hydraulic fluid) in the reservoir chamber A to flow through inside each of the oil passages 40A toward the bottom-side chamber C, and prohibits the electrorheological fluid 22 from flowing in the opposite direction therefrom. In other words, the extension-side check valve 41 permits only the flow of the electrorheological fluid 22 directed from the reservoir chamber A side toward the bottom-side chamber C.

The compression-side relief valve 42 is provided on the body valve 39. The relief valve 42 relieves the actual damping force according to a desired value. The compression-side relief valve 42 is formed by, for example, a disk valve provided on the lower surface side of the body member 40. The compression-side relief valve 42 is opened upon exceedance of the pressure in the bottom-side chamber C over a relief setting pressure (a valve-opening pressure) when the piston 27 is slidably displaced downward during the compression stroke of the piston rod 30, and relieves the pressure at this time by releasing it to the reservoir chamber A side via each of the oil passages 40B.

Now, a suspension apparatus according to the conventional method that switches the damping force with use of a hydraulic valve (a semi-active suspension) employs mineral oil as the base oil of the hydraulic oil, and therefore the performance of the shock absorber is less changeable according to the temperature. That is, the vehicle performance is less changeable even when the temperature of the hydraulic oil is changed. On the other hand, the electrorheological fluid 22 contains silicon oil as the base oil thereof, and thus the viscosity thereof is more changeable according to the temperature compared to the mineral oil. More specifically, the electrorheological fluid 22 becomes highly viscous under a low temperature (increases the damping force), and becomes little viscous under a high temperature (reduces the damping force).

Figure 5:
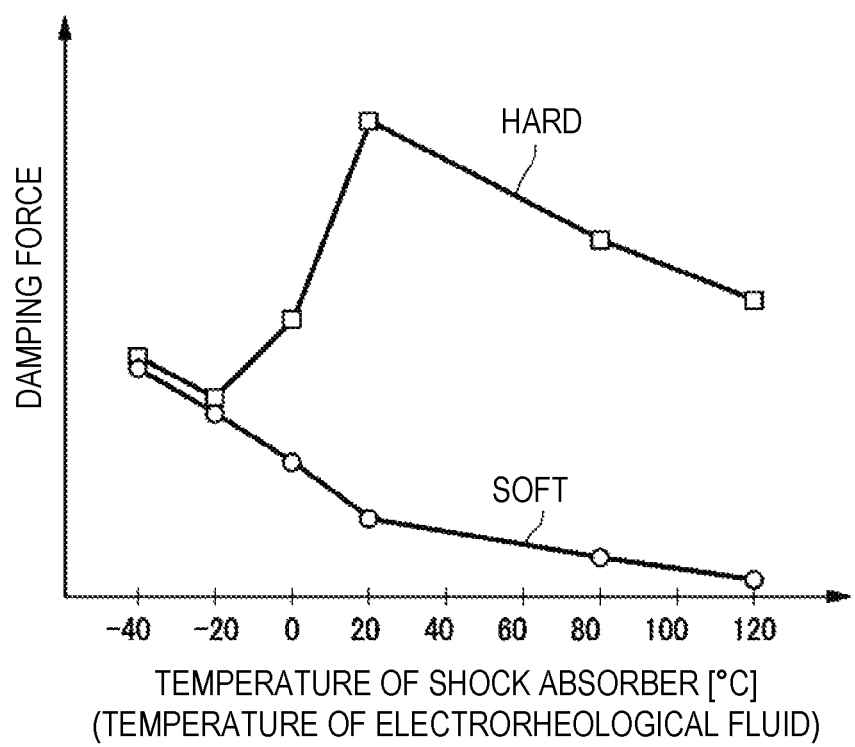
FIG. 5 illustrates characteristic lines each representing the temperature characteristic of the damping force of the shock absorber.

Therefore, the damping force of the shock absorber 21 undesirably considerably changes according to the temperature, as illustrated in FIG. 5. For example, referring to a temperature range of 20° C. or higher as the temperature under which the shock absorber 21 is in normal use in FIG. 5, the electrorheological fluid 22 becomes highly viscous and increases the damping force when having a low temperature. The electrorheological fluid 22 becomes little viscous and reduces the damping force when having a high temperature. As a result, even the same high-voltage instruction value results in a largely different damping force depending on the temperature as illustrated in FIG. 5. For example, when a high voltage indicating the maximum instruction (for example, 5 kV) is applied to the electrorheological fluid 22 to switch the characteristic of the generated damping force (the damping force characteristic) to the high (hard) characteristic, the damping force increases when the electrorheological fluid 22 has the room temperature (for example, 20° C.) or a low temperature (for example, 0° C.) compared to when the electrorheological fluid 22 has a high temperature (for example, 100° C.). Therefore, the damping force would fall short if, with the electrorheological fluid 22 in a high-temperature state, a high voltage is applied to the electrorheological fluid 22 based on the damping force that is generated when the electrorheological fluid 22 has the room temperature. On the other hand, the damping force would be excessively generated if, with the electrorheological fluid 22 in a room-temperature state, a high voltage is applied to the electrorheological fluid 22 based on the damping force that is generated when the electrorheological fluid 22 has a high temperature. This may result in a failure to achieve the target ride comfort performance and steering stability performance.

One possible measure against it is to correct (adjust) the control of the shock absorber 21 according to the temperature of the electrorheological fluid 22 with the aim of solving such inconvenience (the change in the performance, the change in the damping force, and the change in the responsiveness). Now, PTL 1 discusses the technique relating to the damping force-adjustable shock absorber, which estimates the temperature of the solenoid based on the electric current flowing in the solenoid of the proportional solenoid valve and corrects the electric current to supply to the solenoid according to this estimated temperature.

However, in the case of this technique, a difference may be generated between the estimated temperature of the solenoid and the temperature of the hydraulic oil in the shock absorber. For example, on a bad road where the shock absorber is subjected to a violent input, the temperature of the hydraulic oil suddenly increases but this thermal increase is transmitted to the solenoid via the piston or the piston rod of the shock absorber. Therefore, the delay in the thermal transmission may cause a difference between the estimated temperature and the actual temperature of the hydraulic oil and lead to a reduction in the control performance according to this difference. On the other hand, PTL 2 discusses the technique that estimates the temperature of the electrorheological fluid based on the electrostatic capacitance of the electrorheological fluid. However, this technique necessitates a circuit for measuring the electrostatic capacitance of the electrorheological fluid, thereby raising a possibility of making the apparatus complicated. Further, in a case where the instruction value is corrected with use of the estimated temperature, such a configuration results in an increase in the calculation load on the controller, thereby raising a possibility of a cost increase.

Therefore, the shock absorber 21 according to the present embodiment prevents or reduces the change in the damping force according to the temperature by adjusting the valve-opening pressure of the relief valve 29. Generally, a relief valve is used to prevent the breakage due to an abnormal pressure. Therefore, the valve-opening pressure of the relief valve is set to a considerably high pressure compared to the pressure according to the range for controlling the damping force. On the other hand, the valve-opening pressure of the relief valve 29 is set to a low pressure compared to the generally-used relief valve. More specifically, the valve-opening pressure of the relief valve 29 is set based on the actual damping force value that output when the electrorheological fluid 22 has a high temperature.

Figure 8:
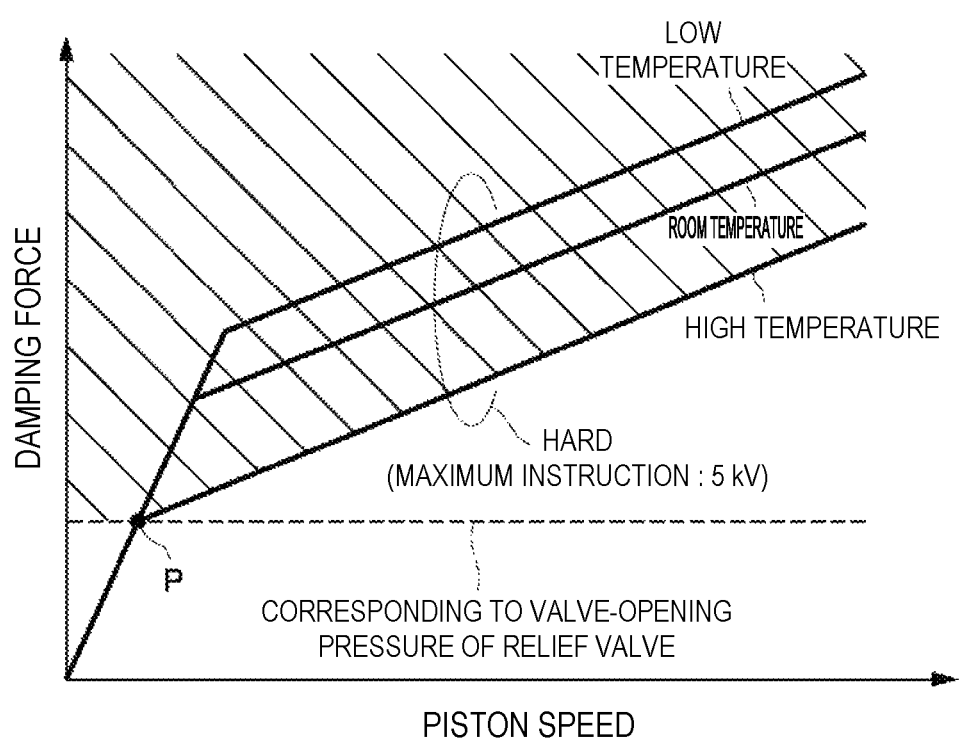
FIG. 8 illustrates characteristic lines each representing the relationship between the damping force and the piston speed when a hard damping force characteristic is set.

For example, the hard damping force characteristic during the extension stroke has an inflection point at which the gradient of the damping force with respect to the piston speed changes as illustrated in FIG. 8. When the piston speed is low, the damping force largely increases with respect to the increase in the piston speed due to, for example, the influence of the flow passages 38. On the other hand, when the piston speed is high, the viscosity of the electrorheological fluid 22 flowing in the flow passages 38 increases according to the high voltage, whereby the damping force less increases with respect to the increase in the piston speed. Therefore, the valve-opening pressure of the relief valve 29 is set to a pressure corresponding to the inflection point (a point P in FIG. 8) as the lowest pressure with which the damping force according to the high voltage is generated when the electrorheological fluid 22 has a high temperature. This setting causes the shock absorber 21 to generate a damping force at a portion where the damping force maximumly reduces in the damping force region where the damping force changes according to the temperature of the electrorheological fluid 22, and prohibits the shock absorber 21 from generating a damping force located in a portion higher than that (the shaded portion in FIG. 8), when the maximum high-voltage instruction is output. As a result, the damping force can be less affected by the temperature.

In this manner, the shock absorber 21 according to the present embodiment is configured to adjust the setting of the valve-opening pressure of the relief valve 29 to prohibit the output of a higher damping force (the shaped portion in FIG. 8) than the pressure when the electrorheological fluid 22 has a high temperature with which the damping force maximumly reduces, when the maximum high voltage (for example, 5 kV) is supplied. As a result, the damping force when the maximum high voltage is supplied can be kept constant even when the temperature is changed.

Next, the processing by the instruction value calculation portion 17 of the controller 16 will be described with reference to FIG. 3. The target damping force calculation portion 17A of the instruction value calculation portion 17 calculates the optimum target damping force based on the detection signal from the sprung acceleration sensor 14. The relative speed calculation portion 17B of the instruction value calculation portion 17 calculates the relative speed (the piston speed) from the detection signal from the sprung acceleration sensor 14 and the detection signal from the unsprung acceleration sensor 15. The damping force map portion 17C of the instruction value calculation portion 17 calculates the high voltage value to output to the shock absorber 21 according to the damping force map based on the target damping force and the relative speed. At this time, the damping force map portion 17C does not use the temperature of the electrorheological fluid 22. Therefore, compared to the configuration discussed in PTL 2, the present configuration eliminates the necessity of the calculation of the estimated temperature of the damper, thereby eliminating the necessity of calculating the high-voltage instruction value from the damping force map for each of a plurality of temperatures. Therefore, the present configuration can reduce the calculation load imposed on the controller 16.

Next, the damping force map of the damping force map portion 17C illustrated in FIG. 3 will be described with reference to FIG. 9. The damping force map is generated based on the damping force characteristic that is established when the electrorheological fluid 22 has a high temperature. Therefore, the damping force map outputs a high voltage value according to the actual damping force value that is generated when the electrorheological fluid 22 has a high temperature, based on the target damping force and the relative speed.

Figure 6:
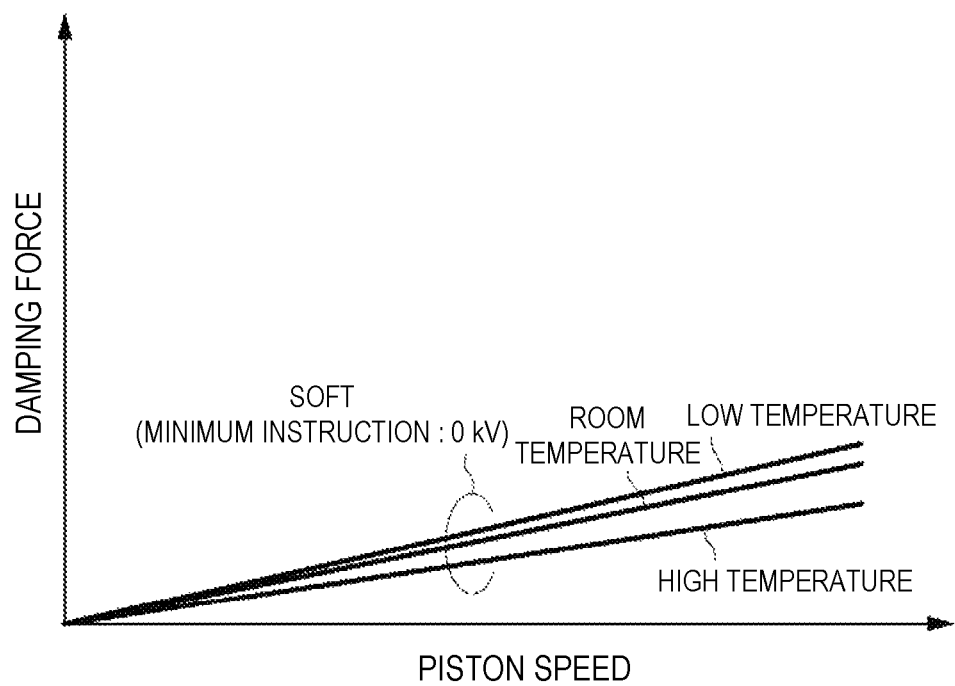
FIG. 6 illustrates characteristic lines each representing the relationship between the damping force and the piston speed when a soft damping force characteristic is set.
Figure 7:
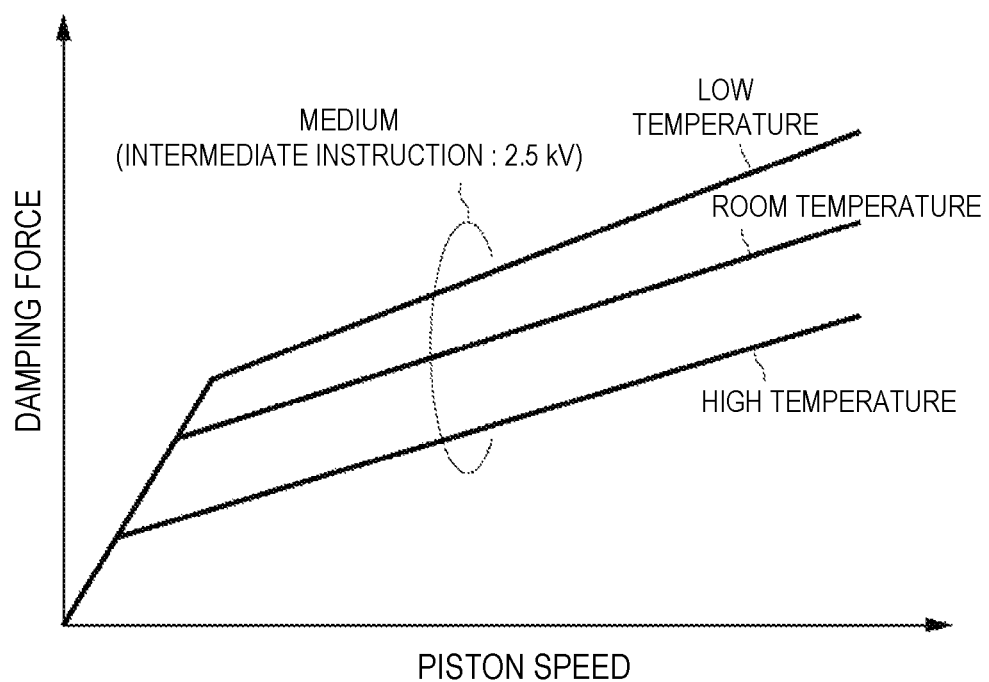
FIG. 7 illustrates characteristic lines each representing the relationship between the damping force and the piston speed when a medium damping force characteristic is set.

As illustrated in FIGS. 6 to 8, the shock absorber 21 has the damping force characteristic according to the temperature of the electrorheological fluid 22. The value of the actual damping force (the actual damping force value) when the electrorheological fluid 22 has a high temperature tends to reduce compared to when the electrorheological fluid 22 has the room temperature or has a low temperature lower than when the electrorheological fluid 22 has a high temperature.

In this case, the damping force characteristic according to the high-voltage instruction value for the minimum instruction (for example, 0 kV) little depends on the temperature as illustrated in FIG. 6. Therefore, the damping force little changes even when the temperature of the electrorheological fluid 22 changes regarding the soft characteristic (the low characteristic).

On the other hand, the damping force characteristic according to the high-voltage instruction value for the maximum instruction (for example, 5 kV) largely depends on the temperature as illustrated in FIG. 8. Therefore, the damping force also largely changes when the temperature of the electrorheological fluid 22 changes regarding the hard characteristic (the high characteristic).

In this case, the damping force map outputs a high voltage value according to the actual damping force that is generated when the electrorheological fluid 22 has a high temperature. Therefore, the damping force generated by the shock absorber 21 tends to increase when the electrorheological fluid 22 has a low temperature compared to when the electrorheological fluid 22 has a high temperature. To address this increase, the shock absorber 21 mechanically utilizes the relief valve 29 to prohibit the generation of a greater damping force (the shaded portion in FIG. 9) than the damping force characteristic that is established when the electrorheological fluid 22 has a high temperature with respect to the damping force characteristic according to the high-voltage instruction value for the maximum instruction (for example, 5 kV). Therefore, even when the temperature changes, the damping force at the time of the maximum instruction little changes.

Figure 9:
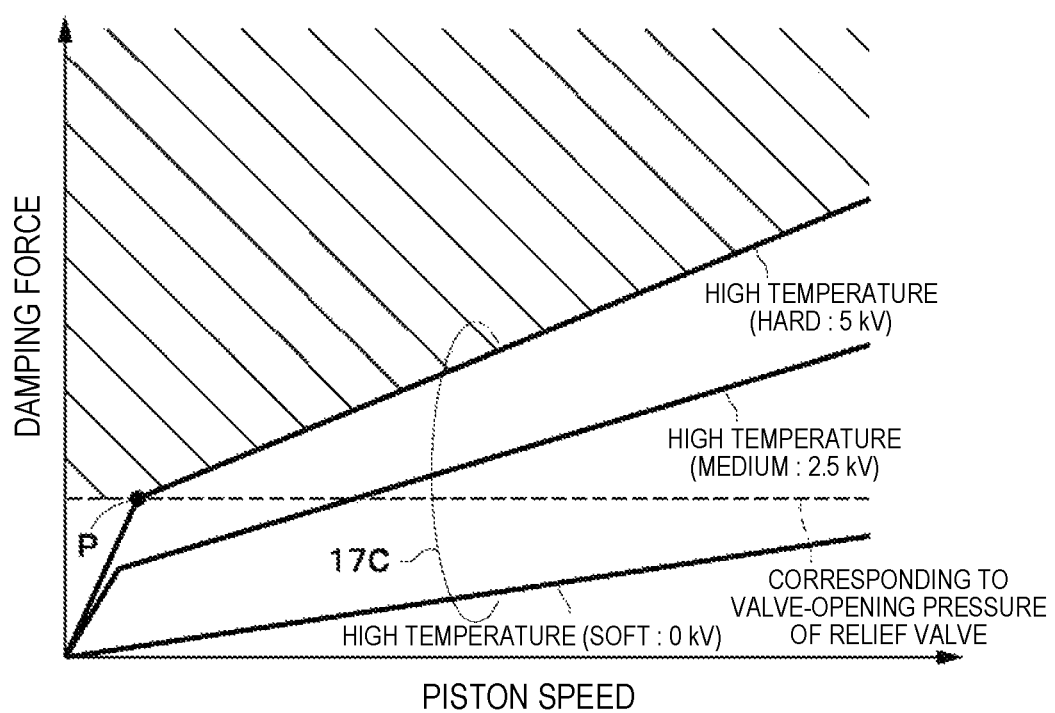
FIG. 9 illustrates a damping force map.

As illustrated in FIG. 9, the instruction value calculation portion 17 includes the damping force map based on the damping force characteristic according to the instruction value that output when the electrorheological fluid 22 has a high temperature regarding an intermediate instruction value (for example, 2.5 kV). The instruction value calculation portion 17 of the controller 16 calculates the instruction value (the high-voltage instruction value) corresponding to the target damping force from this damping force map. Due to this configuration, a greater damping force than the target damping force may be generated when the temperature changes compared to when the electrorheological fluid 22 has a high temperature, i.e., when the electrorheological fluid 22 has the room temperature or when the electrorheological fluid 22 has a low temperature. However, because at least the generated damping force is greater than the target damping force, the damping force is prevented from falling short. Therefore, the present configuration can prevent the deterioration of the performance regarding the steering stability. In addition thereto, the present configuration can prevent the damping force from falling short when the vibration is desired to be damped regarding the ride comfort.

In this manner, in the first embodiment, the relief valve 29 and the instruction value calculated by the instruction value calculation portion 17 are set based on the actual damping force that is generated when the electrorheological fluid 22 has a high temperature. More specifically, the valve-opening pressure of the relief valve 29 is set to the lowest pressure with which the damping force according to the high voltage for the maximum instruction is generated when the electrorheological fluid 22 has a high temperature, as the actual damping force value when the electrorheological fluid 22 has a high temperature. Therefore, the damping force when the maximum high voltage is supplied is kept approximately constant even when the temperature changes.

Further, the instruction value by the instruction value calculation portion 17 is set to the instruction value that is output when the electrorheological fluid 22 has a high temperature. Due to this setting, at least the generated damping force is greater than the target damping force and is prevented from falling short when the electrorheological fluid 22 has a lower temperature than when the electrorheological fluid 22 has a high temperature. Therefore, the present configuration can prevent the deterioration of the performance regarding the steering stability, and, along therewith, prevent the insufficiency of the damping force accompanying the damping of a vibration for the ride comfort.

Further, the hydraulic fluid is the electrorheological fluid 22 having a fluid property changeable according to the electric field. The electrorheological fluid 22 has such a characteristic that the actual damping force value output according to the instruction value output from the instruction value calculation portion 17 increases when the electrorheological fluid 22 has a low temperature compared to when the electrorheological fluid 22 has a high temperature. On the other hand, the relief valve 29 and the instruction value calculated by the instruction value calculation portion 17 are set based on the actual damping force value that is output when the electrorheological fluid 22 has a high temperature. Therefore, when the high-voltage instruction value for the maximum instruction is input to the shock absorber 21, at least the generated damping force is greater than the target damping force and a damping force greater than that is not generated due to the relief valve 29. Therefore, the present configuration can eliminate the change in the damping force according to the temperature.

Further, the shock absorber 21 has the uniflow structure in which the hydraulic fluid (the electrorheological fluid 22) flows in the same direction in the flow passages 38 during the extension stroke, in which the piston rod 30 moves in the direction for exiting from the inner cylinder electrode 23, and the compression stroke, in which the piston rod 30 moves in the direction for entering into the inner cylinder electrode 23. The relief valve 29 is provided on the piston 27. In this case, the relief valve 29 is opened when the pressure in the rod-side chamber B exceeds the valve-opening pressure during the extension stroke. Therefore, the present configuration can keep the damping force according to the maximum instruction during the extension stroke approximately constant even when the temperature changes, by setting the valve-opening pressure of the relief valve 29 based on the actual damping force value corresponding to the maximum instruction value that is output when the electrorheological fluid 22 has a high temperature.

Next, FIGS. 10 to 13 illustrate a second embodiment. The second embodiment is characterized by including a temperature detection portion that detects the temperature of the hydraulic fluid and being configured to correct the instruction value according to the temperature in a range where the instruction value is smaller than a predetermined value. The second embodiment will be described, identifying similar components to the above-described first embodiment by the same reference numerals and omitting descriptions thereof.

A controller 51 according to the second embodiment includes, for example, a microcomputer. The controller 51 includes an instruction value calculation portion 52, which calculates the instruction value to output to the high-voltage driver 7 (the booster circuit 8 thereof), i.e., the high-voltage instruction value based on the information acquired from the sprung acceleration sensor 14 and the unsprung acceleration sensor 15. In addition thereto, the controller 51 includes a temperature estimation portion 53 as the temperature detection portion that detects the temperature of the electrorheological fluid 22 serving as the hydraulic fluid.

Signals input to the controller 51 include the voltage monitoring signal and the electric current monitoring signal output from the high-voltage driver 7, in addition to the sprung acceleration signal output from the sprung acceleration sensor 14 and the unsprung acceleration signal output from the unsprung acceleration sensor 15. The voltage monitoring signal is a signal as a result of monitoring the high-voltage voltage value output from the high-voltage driver 7. The electric current monitoring signal is a signal as a result of monitoring the electric current output from the high-voltage driver 7.

The controller 51 calculates the high-voltage instruction value corresponding to the force that should be output by the shock absorber 21 (the damping force) based on the sprung acceleration signal and the unsprung acceleration signal, which correspond to the behavior information of the vehicle (a vehicle behavior signal), and the voltage monitoring signal and the electric current monitoring signal, which correspond to electric power information of the shock absorber 21 (a shock absorber electric power signal), and outputs this calculated high-voltage instruction value to the high-voltage driver 7. The high-voltage driver 7 outputs the high voltage according to this instruction value to the intermediate electrode cylinder 34 of the shock absorber 21 based on the high-voltage instruction value from the controller 51. When the high voltage is input to the shock absorber 21, the viscosity of the electrorheological fluid 22 changes according to a change in the voltage value thereof (the electric potential difference between the intermediate electrode cylinder 34 and the inner cylinder electrode 23), whereby the damping force characteristic of the shock absorber 21 can be switched (adjusted).

Figure 10:
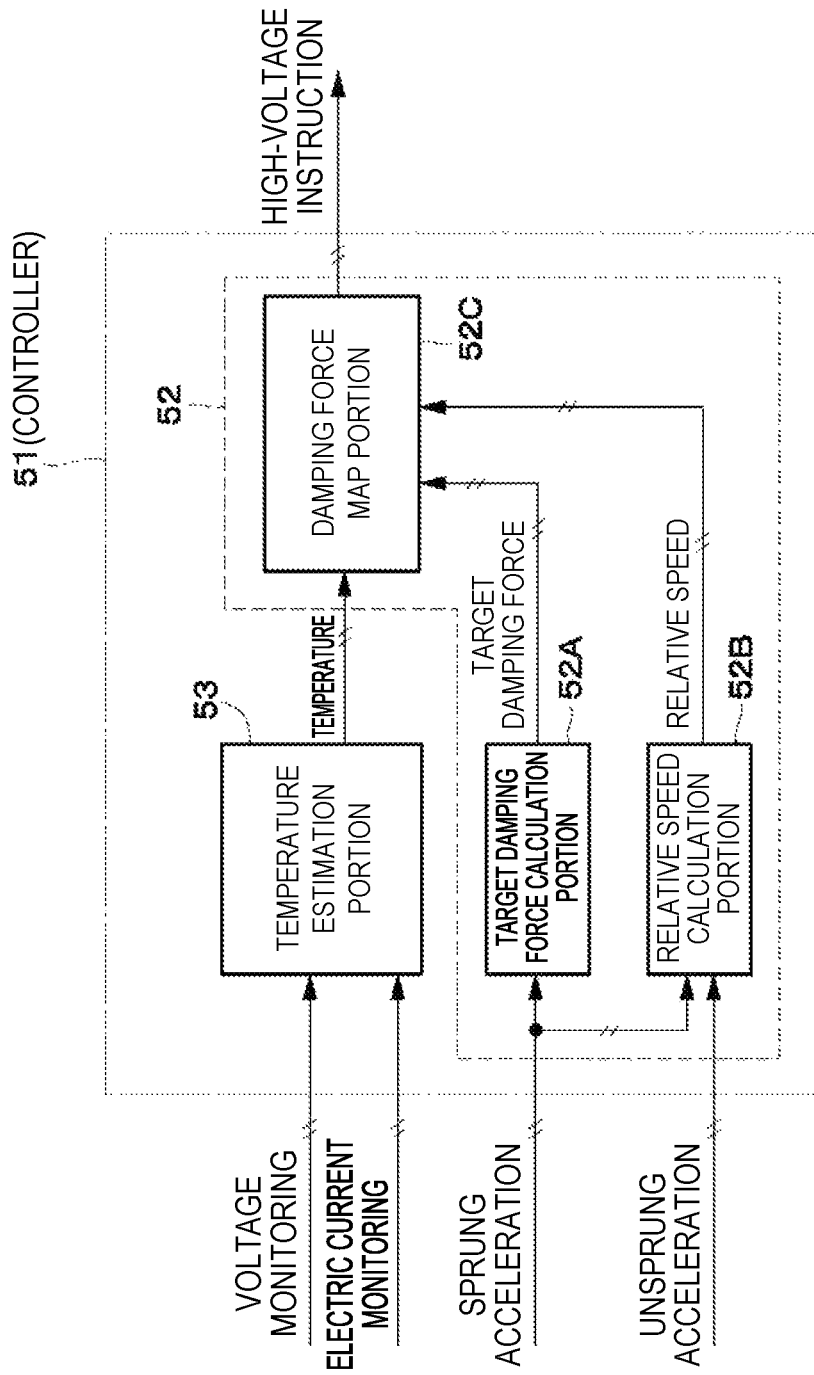
FIG. 10 is a block diagram illustrating a controller according to the second embodiment.

As illustrated in FIG. 10, the instruction value calculation portion 52 of the controller 51 includes a target damping force calculation portion 52A, a relative speed calculation portion 52B, and a damping force map portion 52C. The target damping force calculation portion 52A and the relative speed calculation portion 52B are configured approximately similarly to the target damping force calculation portion 17A and the relative speed calculation portion 17B according to the first embodiment. However, the damping force map portion 52C calculates the high-voltage instruction value, based on which the instruction voltage is generated, with use of a damping force map in consideration of the temperature of the electrorheological fluid 22 in addition to the target damping force and the relative speed. In terms thereof, the damping force map portion 52C is different from the damping force map portion 17C according to the first embodiment that does not take the temperature of the electrorheological fluid 22 into consideration.

The target damping force, the relative speed, and the temperature of the electrorheological fluid 22 are input to the damping force map portion 52C. The damping force map portion 52C calculates the high-voltage instruction value, based on which the instruction voltage is generated, from the target damping force, the relative speed, and the temperature of the electrorheological fluid 22 with use of the damping force map. Now, the damping force map portion 52C includes the damping force map corresponding to the characteristic (the relationship) among the relative speed, the target damping force, the temperature, and the high-voltage instruction value that should be applied. The damping force map is acquired from an experiment, a simulation, or the like and is set (stored) in the damping force map portion 52C in advance as the map corresponding to the relationship (the characteristic) among the target damping force, the relative speed, the temperature, and the instruction voltage that should be applied.

Figure 13:
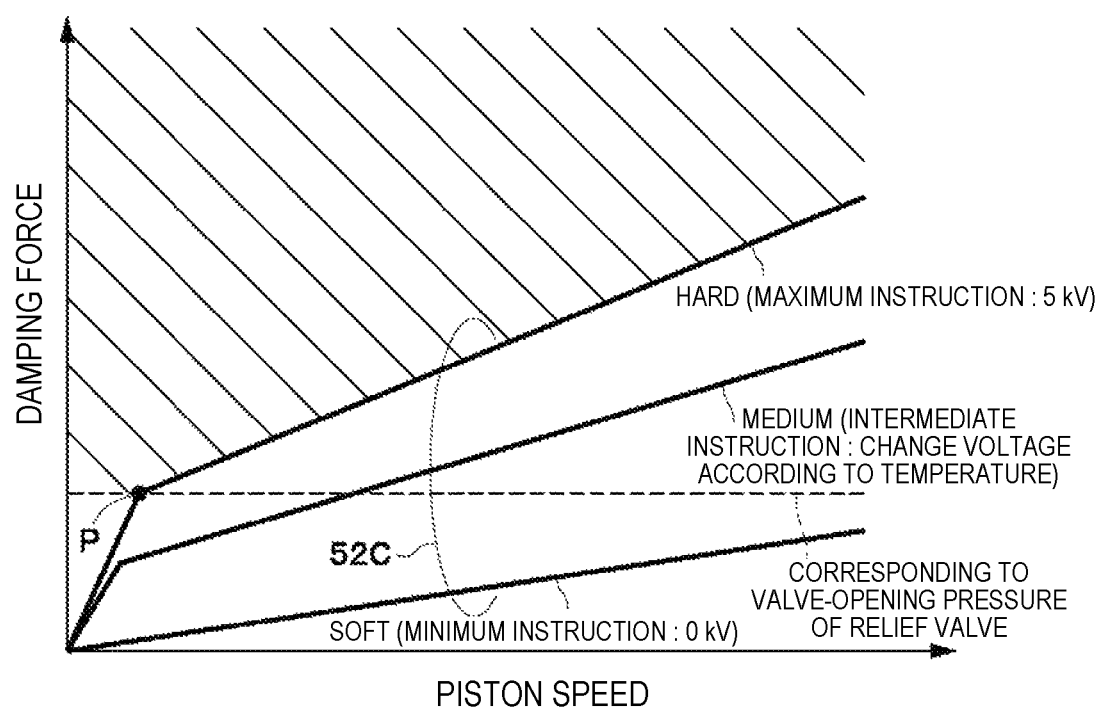
FIG. 13 illustrates a damping force map.

As illustrated in FIG. 13, the damping force map portion 52C calculates the high-voltage instruction value, according to which the instruction voltage is generated, based on the damping force characteristic when the electrorheological fluid 22 has a high temperature (for example, 100° C.) regarding the strong (hard) characteristic (the high characteristic) and the weak (soft) characteristic (the low characteristic) as the characteristic of the generated damping force (the damping force characteristic). In other words, the damping force map portion 52C outputs the high-voltage instruction value set to a predetermined value independently of the temperature regarding the hard characteristic and the soft characteristic. More specifically, the damping force map portion 52C outputs the high-voltage instruction value for the maximum instruction (for example, 5 kV) and the high-voltage instruction value for the minimum instruction (for example, 0 V) based on the damping force characteristic under a high temperature (for example, 100° C.)

In this case, the damping force characteristic according to the high-voltage instruction value for the minimum instruction (for example, 0 kV) little depends on the temperature. Therefore, the damping force little changes even when the temperature of the electrorheological fluid 22 changes regarding the soft characteristic (the low characteristic).

Further, the shock absorber 21 mechanically utilizes the relief valve 29 to prohibit the generation of a greater damping force (the shaded portion in FIG. 13) than the damping force characteristic that is established when the electrorheological fluid 22 has a high temperature with respect to the damping force characteristic according to the high-voltage instruction value for the maximum instruction (for example, 5 kV). Therefore, even when the temperature changes, the damping force at the time of the maximum instruction little changes.

On the other hand, the damping force map portion 52C changes the high-voltage instruction value, based on which the instruction voltage is generated, according to the temperature regarding the intermediate (medium) characteristic set as the characteristic of the generated damping force (the damping force characteristic). For example, the damping force map portion 52C outputs the high-voltage instruction value for the intermediate instruction (for example, 2.5 kV) when the electrorheological fluid 22 has a high temperature (for example 100° C.). On the other hand, the damping force map portion 52C outputs the high-voltage instruction value lower than the high-voltage instruction value (for example, 2.5 kV) that output when the electrorheological fluid 22 has a high temperature, when the electrorheological fluid 22 has a lower temperature than when the electrorheological fluid 22 has the high temperature. As a result, the actual damping force generated by the shock absorber 21 can also be kept approximately constant regarding the intermediate characteristic set as the characteristic of the generated damping force.

In this manner, the damping force map portion 52C calculates the high-voltage instruction value based on which the instruction voltage is generated, while taking the temperature of the electrorheological fluid 22 at that time into consideration regarding the intermediate characteristic. Due to this configuration, a value according to the temperature of the electrorheological fluid 22 at that time can be acquired as the high-voltage instruction value calculated by the damping force map portion 52C. As a result, the present configuration allows the shock absorber 21 to actually generate the damping force (the actual damping force) close to a reference damping force that is generated under a reference temperature of the electrorheological fluid 22 (for example, 100° C., which is a high temperature) independently of the temperature of the electrorheological fluid 22 (whether the temperature of the electrorheological fluid 22 is high or low).

The high-voltage instruction value is calculated with use of the map in the embodiment, but is not limited to being calculated with use of the map and may be calculated with use of, for example, a calculation equation (a function), an array, or the like corresponding to the relationship (the characteristic) among the target damping force, the relative speed, the temperature, and the instruction voltage. Further, although little depending on the temperature regarding the soft characteristic set as the damping force characteristic, the high-voltage instruction value based on which the instruction voltage is generated may also change according to the temperature similarly to the intermediate characteristic to further improve the accuracy.

Next, the specific configuration of the temperature estimation portion 53 will be described with reference to FIGS. 11 and 12.

The temperature estimation portion 53 calculates (estimates) the temperature of the electrorheological fluid 22. Therefore, the voltage monitoring signal and the electric current monitoring signal output from the high-voltage driver 7 are input to the temperature estimation portion 53.

The temperature estimation portion 53 calculates (estimates) the temperature of the electrorheological fluid 22 based on the voltage monitoring signal and the electric current monitoring signal, and outputs this temperature (the estimated temperature) to the damping force map portion 52C. The temperature estimation portion 53 can be configured to calculate (estimate) the temperature with use of the high-voltage instruction signal (i.e., the high-voltage instruction value) and output this temperature (estimated temperature) to the damping force map portion 52C.

Figure 11:
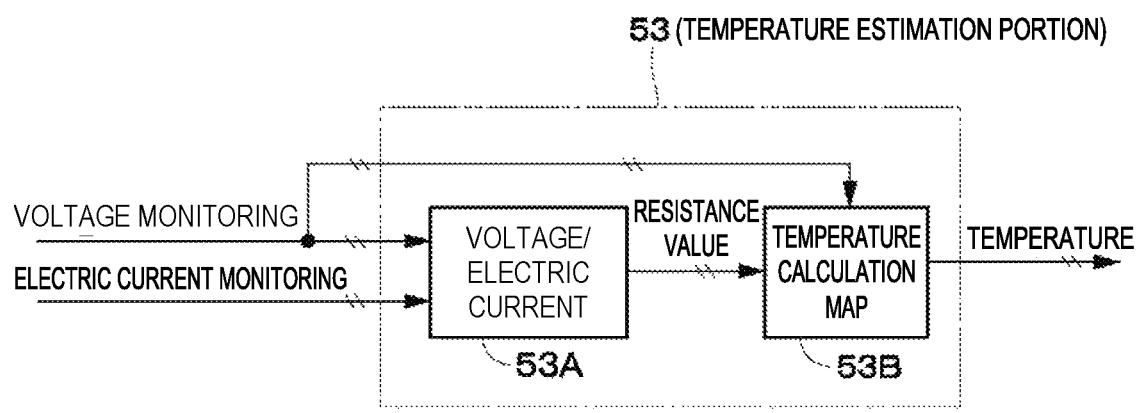
FIG. 11 is a block diagram illustrating a temperature estimation portion in FIG. 10.

As illustrated in FIG. 11, the temperature estimation portion 53 includes a resistance value calculation portion 53A and a temperature calculation map portion 53B. The resistance value calculation portion 53A calculates a resistance value of the electrorheological fluid 22 based on the high-voltage voltage monitoring value and the electric current monitoring value output from the high-voltage driver 7. More specifically, the resistance value calculation portion 53A calculates the resistance value of the electrorheological fluid 22 by dividing the voltage monitoring value by the electric current monitoring value. The resistance value calculated by the resistance value calculation portion 53A is output to the temperature calculation map portion 53B.

Figure 12:
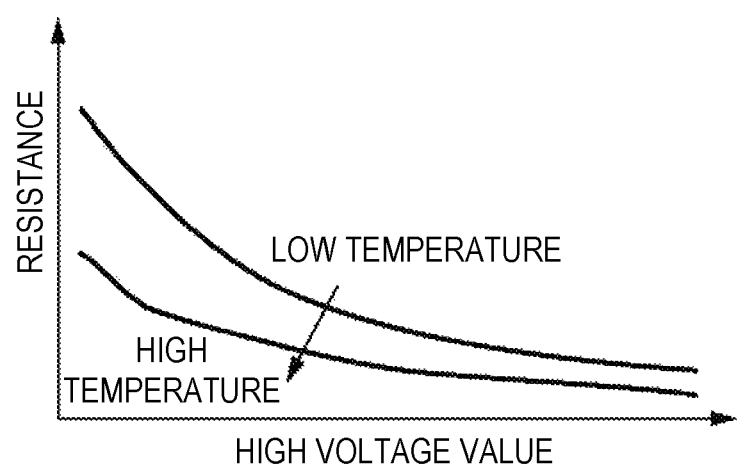
FIG. 12 illustrates characteristic lines each representing the relationship among the high voltage value, the resistance, and the temperature.

The temperature calculation map portion 53B estimates the temperature of the electrorheological fluid 22 based on, for example, a temperature calculation map illustrated in FIG. 12 from the resistance value of the electrorheological fluid 22 calculated by the resistance value calculation portion 53A and the high voltage value indicating the voltage monitoring value. The temperature calculation map indicates a high resistance value when the voltage monitoring value is low and a low resistance value when the high voltage value is high, provided that the temperature is constant. Further, the temperature calculation map indicates a high resistance value when the temperature is low and a low resistance value when the temperature is high, provided that the high voltage value is constant. The temperature of the electrorheological fluid 22 may be estimated with use of the high-voltage instruction value instead of the high voltage value.

Now, the electric resistance value of the electrorheological fluid 22 changes according to the temperature. Therefore, the temperature calculation map portion 53B sets (stores) the relationship (the characteristic) among the "resistance value" of the electrorheological fluid 22, the "temperature", and the applied "high voltage value" that is acquired from an experiment, a simulation, or the like in advance, as, for example, the temperature calculation map illustrated in FIG. 12. The high voltage value (the voltage monitoring value) is used at this time for the purpose of taking into consideration a change in the resistance value due to a change in the high voltage value. The resistance value of the electrorheological fluid 22 changes according to the high voltage value and the temperature as illustrated in FIG. 12, and therefore the temperature of the electrorheological fluid 22 is calculated based on this relationship.

The temperature calculation map portion 53B calculates (estimates) the temperature of the electrorheological fluid 22 based on the resistance value and the high voltage value (the voltage monitoring value) at that time with use of the temperature calculation map illustrated in FIG. 12. The temperature calculated by the temperature calculation map portion 53B is output to the damping force map portion 52C. The temperature is estimated (calculated) with use of the map corresponding to the relationship (the characteristic) among the resistance value of the electrorheological fluid 22, the temperature, and the high voltage value in the second embodiment, but is not limited to being estimated with use of the map and may be estimated with use of, for example, a calculation equation (a function), an array, or the like corresponding to the relationship among the resistance value, the temperature, and the high voltage value.

Further, in the second embodiment, the voltage monitoring value is employed as the high voltage value used to estimate the temperature. However, the present invention is not limited thereto, and an instruction value for a high voltage (the high-voltage instruction value) output from the controller 51 to the high-voltage driver 7 as the high voltage value applied to the electrorheological fluid 22 may be employed instead of the voltage monitoring value.

In this manner, the second embodiment can also acquire substantially similar advantageous effects to the first embodiment. Further, the second embodiment includes the temperature detection portion 53, which detects the temperature of the electrorheological fluid 22, and corrects the instruction value according to the temperature in the range where the instruction value is smaller than the predetermined value corresponding to the smaller damping force than the valve-opening pressure of the relief valve 29. Therefore, even when generating the damping force with which the relief valve 29 is not actuated, the second embodiment can reduce the change in the damping force according to the temperature of the electrorheological fluid 22.

Figure 14:
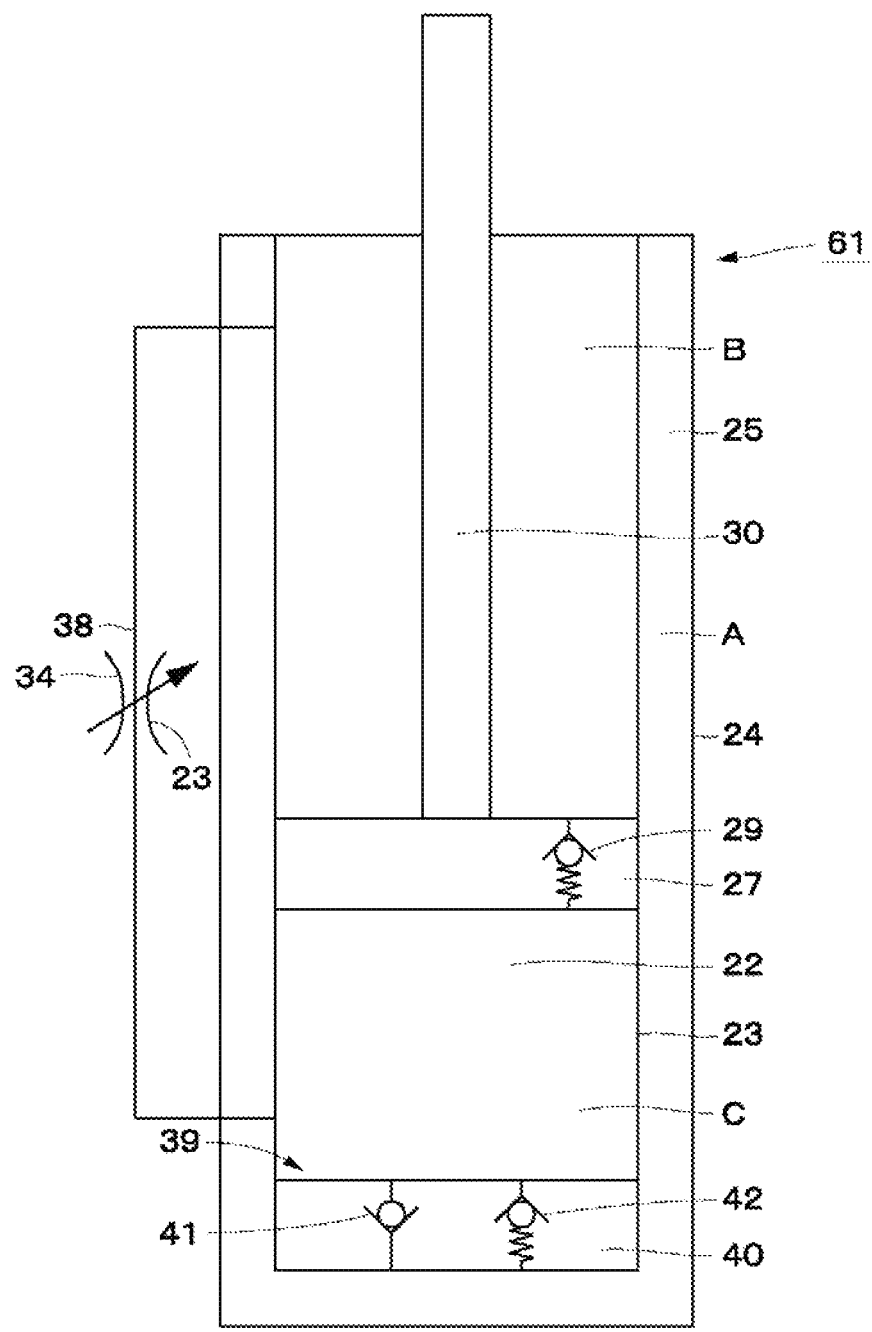
FIG. 14 is a schematic view illustrating a shock absorber according to the third embodiment.

Next, FIG. 14 illustrates a third embodiment. The third embodiment is characterized in that the shock absorber has a biflow structure in which the hydraulic fluid flows in different directions in the flow passages between the extension stroke, in which the piston rod moves in the direction for exiting from the cylinder, and the compression stroke, in which the piston rod moves in the direction for entering into the cylinder, and is configured in such a manner that the relief valve is provided on the piston. The third embodiment will be described, identifying similar components to the above-described first embodiment by the same reference numerals and omitting descriptions thereof.

As illustrated in FIG. 14, the damping force-adjustable shock absorber according to the third embodiment (hereinafter referred to as the shock absorber 61) has the biflow structure in which the electrorheological fluid 22 flows in the flow passages 38 formed between the inner cylinder electrode 23 and the intermediate electrode cylinder 34 in opposite directions between the extension stroke and the compression stroke. Therefore, the electrorheological fluid 22 flows in the flow passages 38 from the rod-side chamber B toward the bottom-side chamber C during the extension stroke. The electrorheological fluid 22 flows in the flow passages 38 from the bottom-side chamber C toward the rod-side chamber B during the compression stroke.

In this manner, the third embodiment can also acquire substantially similar advantageous effects to the first embodiment.

Each of the above-described embodiments uses the target damping force as the control instruction, but may be configured to use the target damping force coefficient. Further, the instruction value calculation portion 17 is assumed to be configured to acquire the voltage value as the instruction value. The present invention is not limited thereto, and the instruction value calculation portion may acquire the electric current value of an electric current that adjusts a magnetic field as the instruction value, for example, when the hydraulic fluid is magnetic fluid.

Each of the above-described embodiments is configured to reduce the change in the damping force characteristic during the extension stroke according to the temperature of the electrorheological fluid 22. The present invention is not limited thereto, and may be configured to reduce the change in the damping force characteristic during the compression stroke according to the temperature of the electrorheological fluid 22. In this case, the valve-opening pressure of the compression-side relief valve 42 provided on the body valve 39 is set based on the actual damping force value that output when the electrorheological fluid 22 has a high temperature. More specifically, the valve-opening pressure of the relief valve 42 is set to the lowest pressure with which the damping force according to the high voltage is generated when the electrorheological fluid 22 has a high temperature, similarly to the valve-opening pressure of the relief valve 29.

The specific numerical values such as the frequency described in each of the above-described embodiments are intended to indicate only one example, and the present invention is not limited to the exemplarily indicated values. These numerical values are set appropriately according to, for example, the specifications to which the above-described embodiments are applied.

Each of the above-described embodiments is only an example, and it is apparent that the configurations indicated in the different embodiments can be partially replaced or combined.

Possible embodiments as the suspension control apparatus based on the above-described embodiments include the following examples.

According to a first configuration, a suspension control apparatus includes a vehicle behavior calculation portion configured to detect a behavior of a vehicle, a damping force-adjustable shock absorber provided between relatively movable two members of the vehicle, and a controller configured to adjust a damping force of the damping force-adjustable shock absorber based on a result of the detection by the vehicle behavior detection portion. The damping force-adjustable shock absorber includes a cylinder sealingly containing hydraulic fluid therein, a piston slidably inserted in this cylinder, a piston rod coupled with this piston and extending to outside the cylinder, an outer cylinder provided on an outer peripheral side of the cylinder, a reservoir provided between the cylinder and the outer cylinder, a body valve provided between the cylinder and the reservoir, and a relief valve provided on the piston or the body valve and configured to relieve an actual damping force according to a desired value. The controller includes an instruction value calculation portion configured to determine an instruction value (a voltage value or an electric current value) to output to the damping force-adjustable shock absorber based on a detection value output from the vehicle behavior detection portion. The hydraulic fluid has such a characteristic that an actual damping force value output according to the instruction value output from the instruction value calculation portion increases when a temperature of this hydraulic fluid is low compared to when the temperature of the hydraulic fluid is high. The relief valve and the instruction value are set based on the actual damping force value that output when the temperature of the hydraulic fluid is high.

According to a second configuration, in the first configuration, the hydraulic fluid is electrorheological fluid having a fluid property changeable according to an electric field.

According to a third configuration, in the first or second configuration, the damping force adjustable-shock absorber has a uniflow structure in which the hydraulic fluid flows in a flow passage in the same direction between an extension stroke, in which the piston rod moves in a direction for exiting from the cylinder, and a compression stroke, in which the piston rod moves in a direction for entering into the cylinder. The relief valve is provided on the piston.

According to a fourth configuration, in the first or second configuration, the damping force adjustable-shock absorber has a biflow structure in which the hydraulic fluid flows in a flow passage in different directions between an extension stroke, in which the piston rod moves in a direction for exiting from the cylinder, and a compression stroke, in which the piston rod moves in a direction for entering into the cylinder. The relief valve is provided on the piston.

According to a fifth configuration, in any of the first to fourth configurations, the suspension control apparatus further includes a temperature detection portion configured to detect the temperature of the hydraulic fluid. The instruction value is corrected according to the temperature of the hydraulic fluid in a range where the instruction value is smaller than a predetermined value.

According to a sixth configuration, in any of the first to fifth configurations, the instruction value is a voltage value. A valve-opening pressure of the relief valve is set to the lowest pressure with which the damping force is generated according to a high voltage when the temperature of the hydraulic fluid is high.

The present invention is not limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-64536 filed on Mar. 29, 2018. The entire disclosure of Japanese Patent Application No. 2018-64536 filed on Mar. 29, 2018 including the specification, the claims, the drawings, and the abstract is incorporated herein by reference in its entirety.

REFERENCE SIGNS LIST 1 vehicle body
2 wheel
4 suspension apparatus
16, 51 controller
17, 52 instruction value calculation portion
21, 61 shock absorber
22 electrorheological fluid (hydraulic fluid)
23 inner cylinder electrode (cylinder)
24 outer cylinder (outer cylinder)
25 reservoir
27 piston
29 relief valve (extension side)
30 piston rod
39 body valve
42 relief valve (compression side)
53 temperature estimation portion

The invention claimed is:
1. A suspension control apparatus comprising:
a vehicle behavior calculation portion configured to detect a behavior of a vehicle;
a damping force-adjustable shock absorber provided between relatively movable two members of the vehicle; and
a controller configured to adjust a damping force of the damping force-adjustable shock absorber based on a result of the detection by the vehicle behavior detection portion,
wherein the damping force-adjustable shock absorber includes
a cylinder sealingly containing hydraulic fluid therein,
a piston slidably inserted in this cylinder,
a piston rod coupled with this piston and extending to outside the cylinder,
an outer cylinder provided on an outer peripheral side of the cylinder, a reservoir provided between the cylinder and the outer cylinder, a body valve provided between the cylinder and the reservoir, and a relief valve provided on the piston or the body valve and configured to relieve an actual damping force according to a desired value, wherein the controller includes an instruction value calculation portion configured to determine an instruction value to output to the damping force-adjustable shock absorber based on a detection value output from the vehicle behavior detection portion, wherein the hydraulic fluid has such a characteristic that an actual damping force value output according to the instruction value output from the instruction value calculation portion increases when a temperature of this hydraulic fluid is low compared to when the temperature of the hydraulic fluid is high, and wherein the relief valve and the instruction value are set based on the actual damping force value that output when the temperature of the hydraulic fluid is high.

2. The suspension control apparatus according to claim 1, wherein the hydraulic fluid is electrorheological fluid having a fluid property changeable according to an electric field.

3. The suspension control apparatus according to claim 1, wherein the damping force adjustable-shock absorber has a uniflow structure in which the hydraulic fluid flows in a flow passage in the same direction between an extension stroke, in which the piston rod moves in a direction for exiting from the cylinder, and a compression stroke, in which the piston rod moves in a direction for entering into the cylinder, and wherein the relief valve is provided on the piston.

4. The suspension control apparatus according to claim 1, wherein the damping force adjustable-shock absorber has a biflow structure in which the hydraulic fluid flows in a flow passage in different directions between an extension stroke, in which the piston rod moves in a direction for exiting from the cylinder, and a compression stroke, in which the piston rod moves in a direction for entering into the cylinder, and wherein the relief valve is provided on the piston.

5. The suspension control apparatus according to claim 1, further comprising a temperature detection portion configured to detect the temperature of the hydraulic fluid, wherein the instruction value is corrected according to the temperature of the hydraulic fluid in a range where the instruction value is smaller than a predetermined value.

6. The suspension control apparatus according to claim 1, wherein the instruction value is a voltage value, and wherein a valve-opening pressure of the relief valve is set to the lowest pressure with which the damping force is generated according to a high voltage when the temperature of the hydraulic fluid is high.

7. The suspension control apparatus according to claim 2, wherein the damping force adjustable-shock absorber has a uniflow structure in which the hydraulic fluid flows in a flow passage in the same direction between an extension stroke, in which the piston rod moves in a direction for exiting from the cylinder, and a compression stroke, in which the piston rod moves in a direction for entering into the cylinder, and wherein the relief valve is provided on the piston.

8. The suspension control apparatus according to claim 2, wherein the damping force adjustable-shock absorber has a biflow structure in which the hydraulic fluid flows in a flow passage in different directions between an extension stroke, in which the piston rod moves in a direction for exiting from the cylinder, and a compression stroke, in which the piston rod moves in a direction for entering into the cylinder, and wherein the relief valve is provided on the piston.

9. The suspension control apparatus according to claim 2, further comprising a temperature detection portion configured to detect the temperature of the hydraulic fluid, wherein the instruction value is corrected according to the temperature of the hydraulic fluid in a range where the instruction value is smaller than a predetermined value.

10. The suspension control apparatus according to claim 2, wherein the instruction value is a voltage value, and wherein a valve-opening pressure of the relief valve is set to the lowest pressure with which the damping force is generated according to a high voltage when the temperature of the hydraulic fluid is high.

* * * * *